United States Patent [19]

Choi

[11] Patent Number: 5,583,839
[45] Date of Patent: Dec. 10, 1996

[54] APPARATUS FOR ELEVATING A SPINDLE ASSEMBLY OF A DISC PLAYER

[75] Inventor: Youngsuk Choi, Seoul, Rep. of Korea

[73] Assignee: Daewoo Electronics Co., Ltd., Seoul, Rep. of Korea

[21] Appl. No.: 363,347

[22] Filed: Dec. 23, 1994

[30] Foreign Application Priority Data

Dec. 28, 1993 [KR] Rep. of Korea ............... 93-30147
Dec. 28, 1993 [KR] Rep. of Korea ............... 93-30148
Dec. 28, 1993 [KR] Rep. of Korea ............... 93-30149
Dec. 28, 1993 [KR] Rep. of Korea ............... 93-30150
Dec. 28, 1993 [KR] Rep. of Korea ............... 93-30151
Dec. 30, 1993 [KR] Rep. of Korea ............... 93-31228

[51] Int. Cl.⁶ ................................................ G11B 33/02
[52] U.S. Cl. ................................................... 369/75.2
[58] Field of Search ............................ 369/75.1, 75.2, 369/77.1, 77.2, 270; 360/99.08, 99.12, 97.01

[56] References Cited

U.S. PATENT DOCUMENTS

| | | | |
|---|---|---|---|
| 4,439,851 | 3/1984 | Kiguchi | 369/77.2 |
| 4,527,264 | 7/1985 | d'Alayer de Costemore d'Arc | 369/77.1 |
| 4,680,748 | 7/1987 | Kobayashi | 369/77.1 |
| 4,797,865 | 1/1989 | Imai et al. | 369/39 |
| 4,890,276 | 12/1989 | Ono et al. | 369/270 |
| 4,965,685 | 10/1990 | Thompson et al. | 360/99.09 |
| 5,172,361 | 12/1992 | Urushibata et al. | 369/77.1 |
| 5,177,731 | 1/1993 | Tanaka et al. | 369/270 |
| 5,301,176 | 4/1994 | Kawachi et al. | 369/75.2 |

FOREIGN PATENT DOCUMENTS

| | | |
|---|---|---|
| 0148553 | 7/1985 | European Pat. Off. . |
| 0400949 | 12/1990 | European Pat. Off. . |
| 0450528 | 10/1991 | European Pat. Off. . |
| 0450538 | 10/1991 | European Pat. Off. . |
| 0481640 | 4/1992 | European Pat. Off. . |
| 0576253 | 12/1993 | European Pat. Off. . |
| 3638914 | 5/1988 | Germany ............... 369/270 |
| 1176362 | 7/1989 | Japan ............... 369/270 |

*Primary Examiner*—Robert S. Tupper
*Assistant Examiner*—David D. Davis
*Attorney, Agent, or Firm*—Oliff & Berridge

[57] ABSTRACT

Disclosed is an elevating apparatus of a spindle assembly of a disc player for adjusting height of the spindle assembly to rotate a minidisc and a compact disc which are mounted on a minidisc tray and a compact disc tray, respectively. The spindle assembly having a turntable for rotating the disc mounted on the tray is secured thereto to reciprocate vertically in a first direction. The elevating apparatus is secured to a lower portion of the base plate to reciprocate in a horizontal direction of a second direction perpendicular to the first direction thereby to move vertically the spindle assembly. An actuation apparatus is provided thereon to move backwards and forwards the elevating apparatus. In the compact and minidisc player capable of selective reproduction operation, height difference between a minidisc mounting surface and a compact disc mounting surface can be compensated.

20 Claims, 12 Drawing Sheets

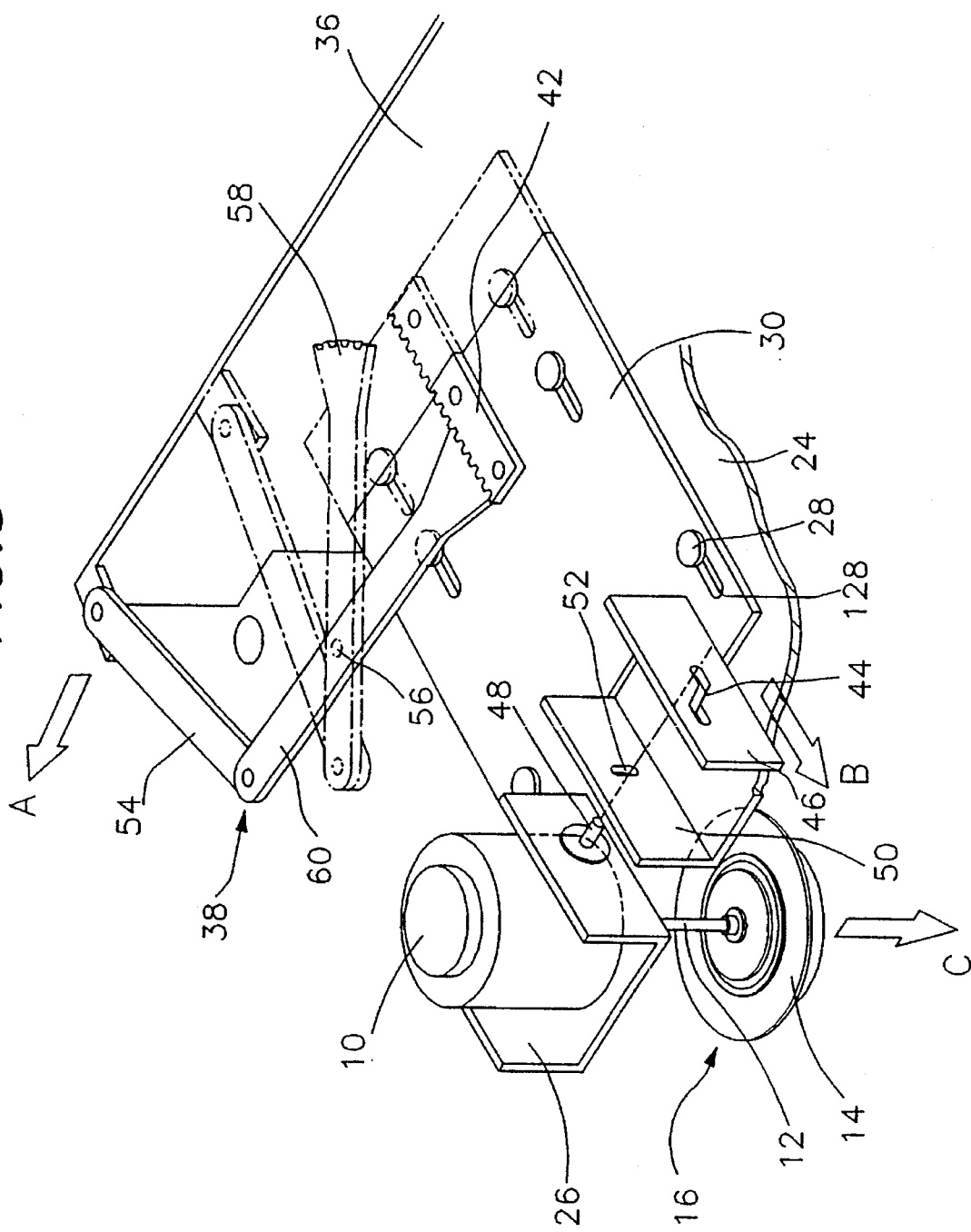

APPARATUS FOR ELEVATING A SPINDLE ASSEMBLY OF A DISC PLAYER

BACKGROUND OF THE INVENTION

1. Field of the invention

The present invention relates to an apparatus for elevating a spindle assembly of a disc player. More particularly, the present invention relates to an apparatus for elevating a spindle assembly of a disc player which can play selectively a compact disc and a minidisc by using a single pickup device and a single spindle assembly of which the height can be automatically adjusted in accordance with kinds of discs.

2. Description of the Prior Arts

Nowadays, each of minidisc player and compact disc player is used for reproduction of only the respective type of the disc. Thus, when a user wants to obtain information from different types of discs, he should separately buy a new player applicable thereto.

In general, the disc which is at a naked state or at an encased state in a cartridge is mounted on the tray to be loaded on the player. These disc loading methods depend on the disc player's structure, so that the user can not load the disc by his own selection in view of the disc player's structure. Also, in fields of a common disc player used for reproducing discs of different sizes, although products which can reproduce the discs of different sizes such as a laser disc (LD), a compact disc (CD), etc. are being manufactured, those can be applicable only to the discs of different sizes which are at the naked state.

Further, Katsuichi Sakurai et al. proposed a disc player capable of reproducing both a naked disc and a cartridge-encased disc in E.P. Publication 525201 A2 (corres. U.S.Pat. No. 5,299,185).

Also, Hideo Kawachi et al. proposed the disc player capable of reproducing both a naked disc and a cartridge-encased disc in E.P. Publication 518259 A3 (corres. U.S. Pat. No. 5,301,176). However, the above disc player can reproduce the disc having the same size (or diameter).

Recently, an MD/CD disc player which can selectively reproduce a CD and an MD by using a single optical pickup device and a single spindle assembly having a turntable, a spindle motor and a spindle shaft has been developed in order to solve problems of the prior art minidisc player and compact disc player.

In the MD/CD disc player provided with the single spindle assembly and the single pickup device, in order that the MD or the CD can be selectively mounted on the turntable constituting the spindle assembly, a double structure wherein there is a predetermined height difference between a compact disc tray and a minidisc tray is necessary in the disc player. Also, the MD is mounted on an upper portion of the turntable constituting the spindle assembly and the CD is mounted on a lower portion of the turntable constituting the spindle assembly. Further, in the double structure having a double tray structure and a turntable structure, since when reproducing the disc, a predetermined distance between the discs which are mounted on the respective trays and the pickup device should be always maintained, the height of the spindle assembly should be adjusted in accordance with the tray on which the desired disc is mounted.

In the above Hideo Kawachi et al. patent, there is also disclosed an apparatus for elevating the spindle assembly wherein one side of a chassis supporting the spindle assembly is fixed to a main chassis of the disc player and the spindle assembly can be moved up and down in a radial direction centering around the fixing point. However, the apparatus for elevating the spindle assembly can be applicable to the naked and cartridge-encased discs of only the same size, so that the disc player should be changed in its structure in order to drive the MD and CD having different sizes. In addition, since only one end of spindle assembly elevating apparatus is moved reciprocatingly while the other end is fixed, it is difficult to precisely adjust a position of the spindle assembly.

SUMMARY OF THE INVENTION

The present invention is intended to overcome the above-mentioned and numerous other disadvantages and deficiencies of the prior art.

Therefore, it is an object of the present invention to provide an apparatus for elevating a spindle assembly of a disc player which can play a CD and an MD and is provided with a single pickup device and a single spindle assembly having a turntable, a spindle motor and a spindle shaft in order to elevate the spindle assembly for rotating the CD and the MD mounted on a compact disc tray and a minidisc tray, respectively.

To achieve the above-described object of the present invention, there is provided a disc player comprising:

a base plate;

a spindle assembly having a turntable for rotating a disc secured to the base plate, the spindle assembly being reciprocated vertically in a first direction;

an elevating means secured under the base plate for reciprocating the spindle assembly, the elevating means being horizontally reciprocated within a predetermined distance in a second direction perpendicular to the first direction; and an actuation means for actuating a reciprocating movement of the elevating means.

In accordance with one embodiment of the present invention, the actuation means receives a reciprocating force from a moving plate which is reciprocated horizontally in a third direction perpendicular to the second direction to transmit a driving force to a tray on which the disc is mounted in order to load and unload a disc, in order to actuate the elevating means.

According to the present invention, the disc player preferably has a tray holder supporting a disc cartridge tray on which a first disc (often referred to as "mini-disc") encased in a cartridge is mounted and a disc tray on which a second naked disc (often referred to as "compact disc") larger than the first disc is mounted, and therefore the actuating means drives the elevating means so that the spindle assembly reciprocates vertically within a distance corresponding to difference of heights between the disc cartridge tray and the disc tray. The spindle assembly has a spindle shaft connected to the turntable and a spindle motor for driving the spindle shaft, the assembly being supported by a bracket having a pair of guide pins projected from its sides toward the outside.

According to another embodiment of the present invention, the elevating means has an elevating plate to reciprocate in a horizontal direction under the base plate, a rack gear formed on a central portion of an outer side of the elevating plate directed to a moving plate in a reciprocating direction of the elevating plate to be connected to the actuation means, and a pair of elevating guide plates each having a cam hole for defining a vertical reciprocating movement of the spindle assembly formed on a central portion of an inner side of the elevating plate directed to the spindle assembly.

According to still another embodiment of the present invention, the rack gear has a gear piece having a gear portion connected to the actuation means, a hook piece disposed on an opposite side to a gear formation portion and an elastic portion for absorbing impacts and a bracket having a hooking groove where the hook piece is hooked, an insertion groove for receiving the elastic portion, gear guide portions for guiding the gear piece, and screw holes for securing to the elevating plate.

According to still another embodiment of the present invention, the actuation means has an assembling link rotatably connected to a lower portion of a rear end of a moving plate to be rotated backwards and forwards conforming to a reciprocating movement along a straight line of the moving plate and an actuation link having a first end rotatably connected to an end of the assembling link and a second end having an actuation gear portion shaped in an arc which is meshed with the elevating means, the actuation link being hinged under the base plate at a center portion thereof through a rotation shaft.

The disc player may further include a vibration prevention means for absorbing minute vibrations when a spindle motor is operated. The vibration preventing means has a pair of first spring engaging projections projected from both sides of the elevating means, a pair of springs each of which one end is secured to each of the spring engaging projections and a pair of second spring engaging projections projected from bottom portions of the base plate. The disc player may further have a deviation preventing means for preventing the elevating means from being moved away as caused by the springs.

According to still another embodiment of the present invention, the elevating means has an elevating plate formed under the base plate to reciprocate in a horizontal direction, an operation boss projected from a central portion of an outer side of the elevating plate directed to a moving plate to be connected to the actuation means and a pair of elevation guiding plates each having a cam hole at a central portion thereof for defining a reciprocating movement in a vertical direction, the elevation guiding plate being at a central portion of an inner side of the elevating plate directed to the spindle assembly. Preferably, a recessed groove for being easily connected to the elevating means is formed on an outer periphery of the operation boss.

According to still another embodiment of the present invention, the actuation means has an assembling link rotatably connected to a lower portion of a rear end of a moving plate to be rotated backwards and forwards conforming to a reciprocating movement along a straight line of the moving plate, an actuation link having a first end rotatably connected to an end of the assembling link and a second end having an actuation gear portion shaped in an arc which is meshed with the elevating means, and a spring connected between the base plate and the elevating means.

According to still another embodiment of the present invention, a receiving portion is formed on one end of the elevating means corresponding to an opposite side of the spindle assembly and the actuation means has an actuation rod inserted into the receiving portion to be fixed thereto and a solenoid body operating the actuation rod in a reciprocating movement by an electric force.

When loading an MD thereon, the spindle assembly is not operated to maintain location of the spindle assembly as it is. When loading a CD thereon, the elevating apparatus of the spindle assembly is operated to constantly move up the spindle assembly to a position suitable for driving the CD, so that difference between the height of the mounting surface of the MD formed on the turntable and that of the CD can be adjusted. In the compact and minidisc disc player which can selectively play the MD and the CD by means of one spindle assembly and pickup apparatus, the apparatus of the present invention can be preferably used for compensating difference between the height of the mounting surface of the MD formed on the turntable and that of the CD.

BRIEF DESCRIPTION OF THE DRAWINGS

The present invention may be better understood and its numerous objects and advantages will be more apparent to those skilled in the art by reference to the accompanying drawings in which:

FIG. 3 is a perspective view for showing a bottom portion of the apparatus for elevating a spindle assembly as shown in FIG. 1;

DESCRIPTION OF THE PREFERRED EMBODIMENTS

The preferred embodiments of the present invention will be described in detail with reference to the accompanying drawings.

Embodiment 1

Figure 1:
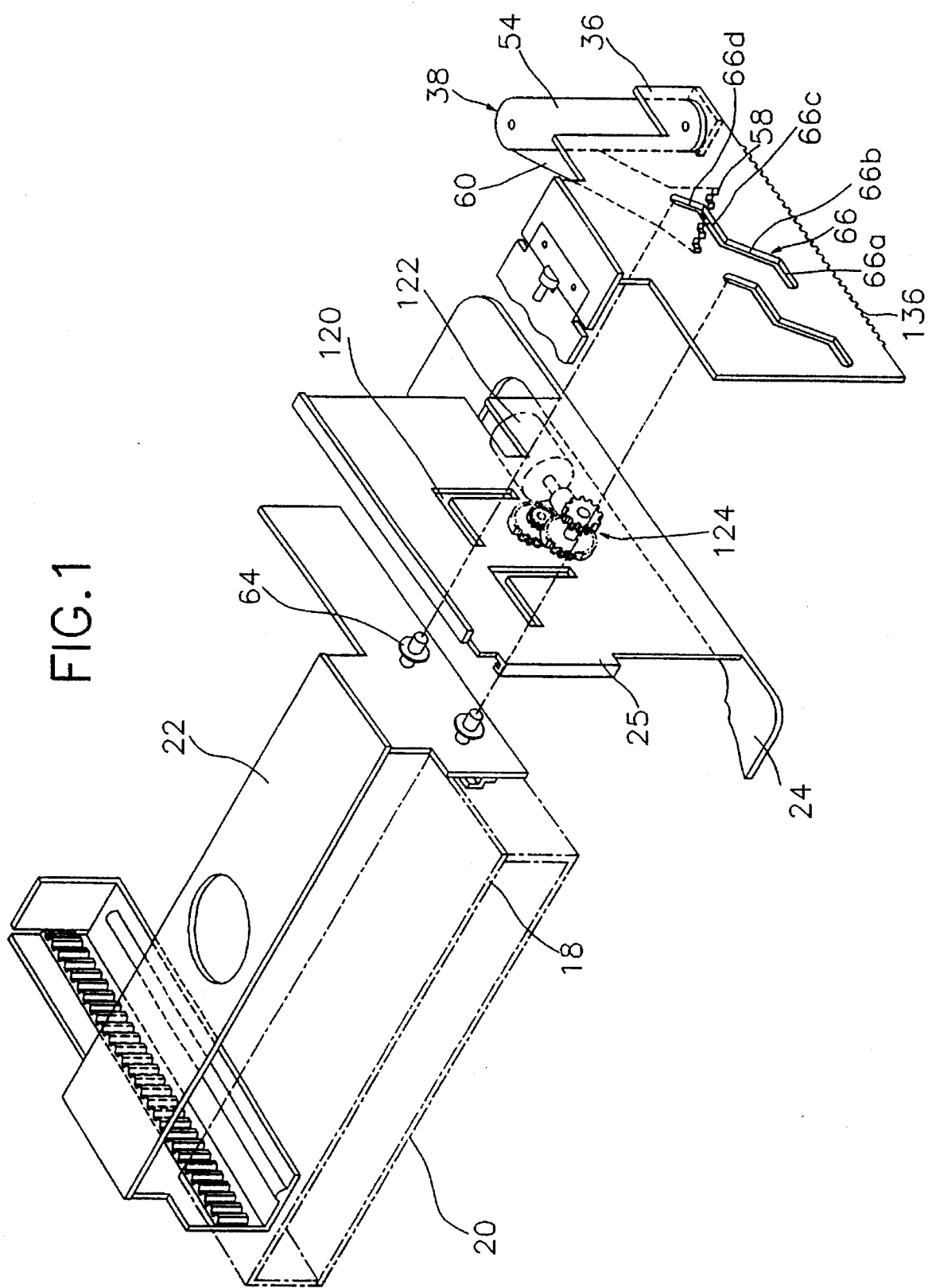
FIG. 1 is an exploded perspective view for showing an apparatus for elevating a spindle assembly of a minidisc and compact disc player according to a first embodiment of the present invention.
Figure 2:
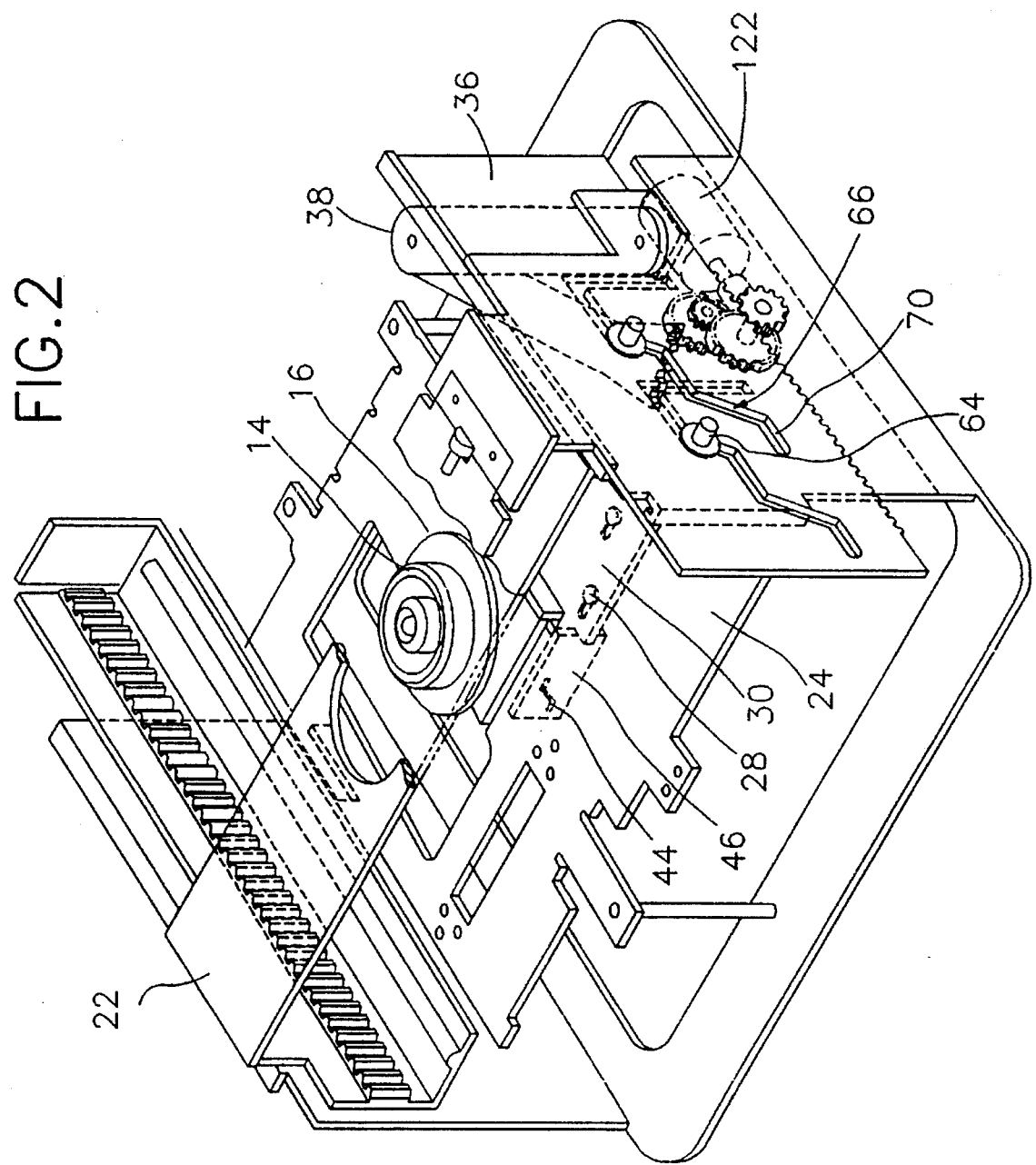
FIG. 2 is a perspective view for showing an assembled state of the apparatus for elevating a spindle assembly as shown in FIG. 1.

FIG. 1 is an exploded perspective view for showing an apparatus for elevating a spindle assembly of a minidisc and compact disc player according to a first embodiment of the present invention. FIG. 2 is a perspective view for showing an assembled state of the apparatus for elevating a spindle assembly as shown in FIG. 1. FIG. 3 is a perspective view for showing a bottom portion of the apparatus for elevating a spindle assembly as shown in FIG. 1. In FIG. 3, an arrow A indicates a reciprocating direction of a moving plate 36, an arrow B indicates a reciprocating direction of a elevating plate 30 and an arrow C indicates a vertical reciprocating direction of a spindle assembly.

As shown in FIGS. 1 through 3, the disc player is provided with a single spindle assembly 16, a single pickup apparatus (not shown) and a base plate 24 for supporting them.

Base plate 24 has a side wall 25 having a tray holder guide hole 120 of a reversed "L" shape for guiding a movement of a tray holder 22. A motor 122 for generating a driving force for driving tray holder 22 to load/unload a disc onto/from a turntable and a driving gear part 124 having a series of gears for transmitting the driving force to moving plate 36 are provided on a rear end of one side of base plate 24.

A compact disc tray 18 is secured in tray holder 22, and a minidisc tray 20 having a predetermined height difference therefrom is combined with minidisc tray 20 to form an up-and-down double structure within tray holder 22 under compact disc tray 18. A pair of tray guide rods are formed on both left and right sides of tray holder 22.

On a base plane of moving plate 36, a rack gear 136 is formed so that moving plate 36 drives tray holder 22 by receiving a driving force transmitted through driving gear part 124. A pair of tray holder guide holes 66 into which guide rods 64 of tray holder 22 are inserted are formed at a center portion of moving plate 36.

Each of tray holder guide holes 66 has a lower horizontal portion 66a which is extended outward and an upper horizontal portion 66c which is extended inward. A lower inclined portion 66b having an obtuse-angled connecting portion is formed between an inner end of lower horizontal portion 66a and an outer end of upper horizontal portion 66c. An obtuse-angled upper inclined portion 66d is extended from an inner end of upper horizontal portion 66c.

Spindle assembly 16 includes a spindle motor 10, a spindle shaft 12 connected to spindle motor 10 and a turntable 14 for rotating a disc by the rotation of spindle shaft 12. Spindle motor 10, spindle shaft 12 and turntable 14 are secured to a bracket 26 which can reciprocate within a predetermined distance and is fixed on base plate 24. That is, from both sides of bracket 26 a pair of guide pins 48 are projected. A pair of vertical guide plates 50 (in FIGS. 1 through 3 show one vertical guiding plate and omit the other) are bendingly formed from the base of base plate 24 on which spindle assembly 16 is mounted. At a center portion of each of vertical guide plates 50, there is formed a vertical guide hole 52 into which one of guide pins 48 of bracket 26 is inserted. The length of vertical guide hole 52 is the same as the difference between the height of a mounting surface of a minidisc formed on turntable 14 and that of a compact disc so that guide pin 24 can reciprocate in a vertical direction within vertical guide hole 52. Plural guide projections 28 are formed under (on a lower portion of the base of) base plate 24 for guiding the movement of the spindle assembly elevating apparatus.

The disc player has an elevating plate 30 for moving upwards and downwards spindle assembly 16 in a vertical direction while moving horizontally in the left and right directions within a predetermined distance. Elevating plate 30 has a thin thickness and a hexahedron shape. Elevating plate 30 has a plurality of elongated guide holes 128 of a predetermined length corresponding to guide projections 28 formed under base plate 24. A rack gear 42 is secured to a central portion of an outer side (directed to the moving plate) under elevating plate 30. A pair of elevating guide plates 46 (FIGS. 1 through 3 show the elevating guide plate disposed on one side and do not show the other disposed on the other side) having a cam hole 44 which has the same height as the difference between the height of a minidisc mounting surface and that of a compact disc mounting surface is disposed on an outer side (directed to the spindle assembly) of vertical guide plate 50 of base plate 24. Cam hole 44 has a first lower horizontal portion and a second higher horizontal portion which have the same height difference as the minidisc mounting surface from the compact disc mounting surface. An inclined portion is formed between the first and second horizontal portions. The inclined portion and the first and second horizontal portions are connected to one another with an obtuse-angled connection. Guide pins 48 formed on both sides of bracket 26 are inserted into vertical guide hole 52 of vertical guide plate 50 and cam holes 44 of elevating guiding plate 46.

The disc player has an elevation plate actuation apparatus 38 for operating elevation plate 30 to reciprocate in a horizontal direction. Elevating plate actuation apparatus 38 has an assembling link 54 and an actuation link 60.

Assembling link 54, one end of which is rotatably connected to a lower portion of a rear end of moving plate 36, rotatably reciprocates conforming to a fore-and-aft movement of moving plate 36 in a straight line. One end of actuation link 60 is rotatably connected to the other end of assembling link 54. A central portion of actuation link 60 is hinged under base plate 24 on a rotation axis 56. At the other end of actuation link 60, an actuation gear portion 58 of an arc shape is formed. Actuation gear portion 58 may be meshed with rack gear 42 of elevation plate 30, so that elevating plate 30 may reciprocate in a horizontal direction.

Hereinafter, an operation of the disc player according to the present embodiment will be described.

Figure 4A:
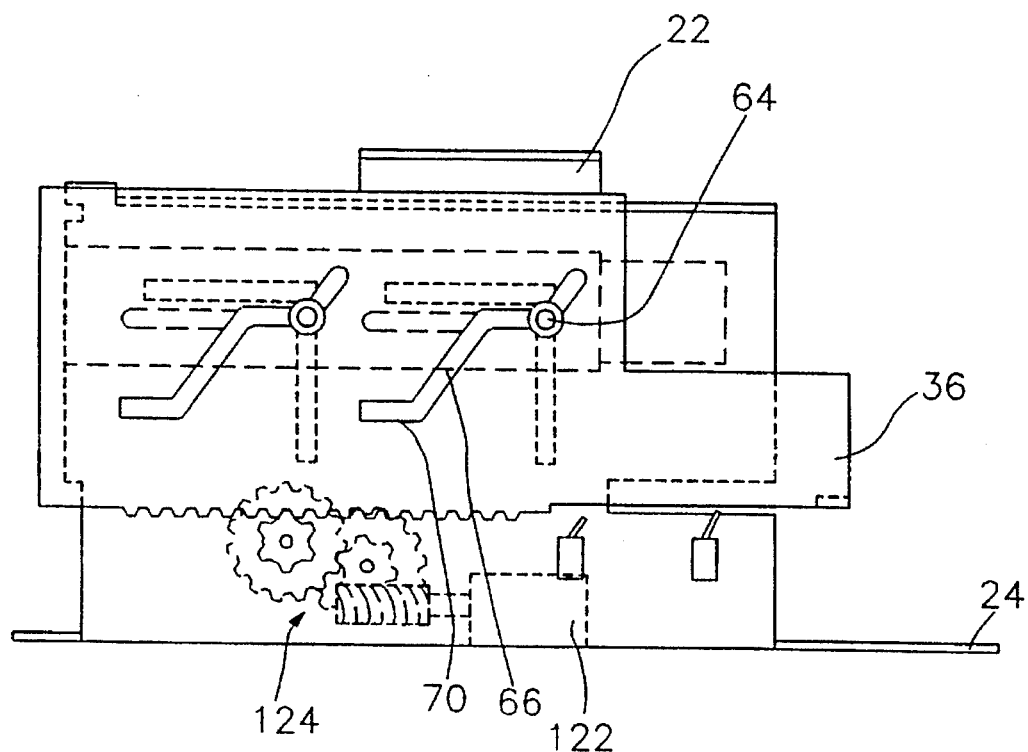
FIG. 4A is a schematic view for showing an operation of the apparatus for elevating a spindle assembly as shown in FIGS. 1 through 3 when loading an MD.

FIG. 4A is a schematic view for showing an operation of the elevating apparatus of the spindle assembly as shown in FIGS. 1 through 3 when loading an MD.

As shown in the figure, when a user inserts an MD into the player and loads the MD on minidisc tray 20, a driving force of loading motor 122 is transmitted through driving gear connecting part 124 to moving plate 36, which is moved backwards. In accordance with the backward movement of moving plate 36, guide rods 32 projected from sides of tray holder 22 are moved backwards along a straight line at a predetermined distance to be hooked at a stepped portion between upper inclined portion 66d and upper horizontal portion 66c, so that the minidisc cartridge is mounted on the mounting surface formed on turntable 14 constituting spindle assembly 16. At that state, when pushing a play switching button, the MD is rotated and the pickup device is operated to perform a reproducing operation of the MD.

At that time of the reproducing operation, a fixation state of spindle assembly 16 is maintained as it is without any vertical movement in upward or downward direction.

Figure 4B:
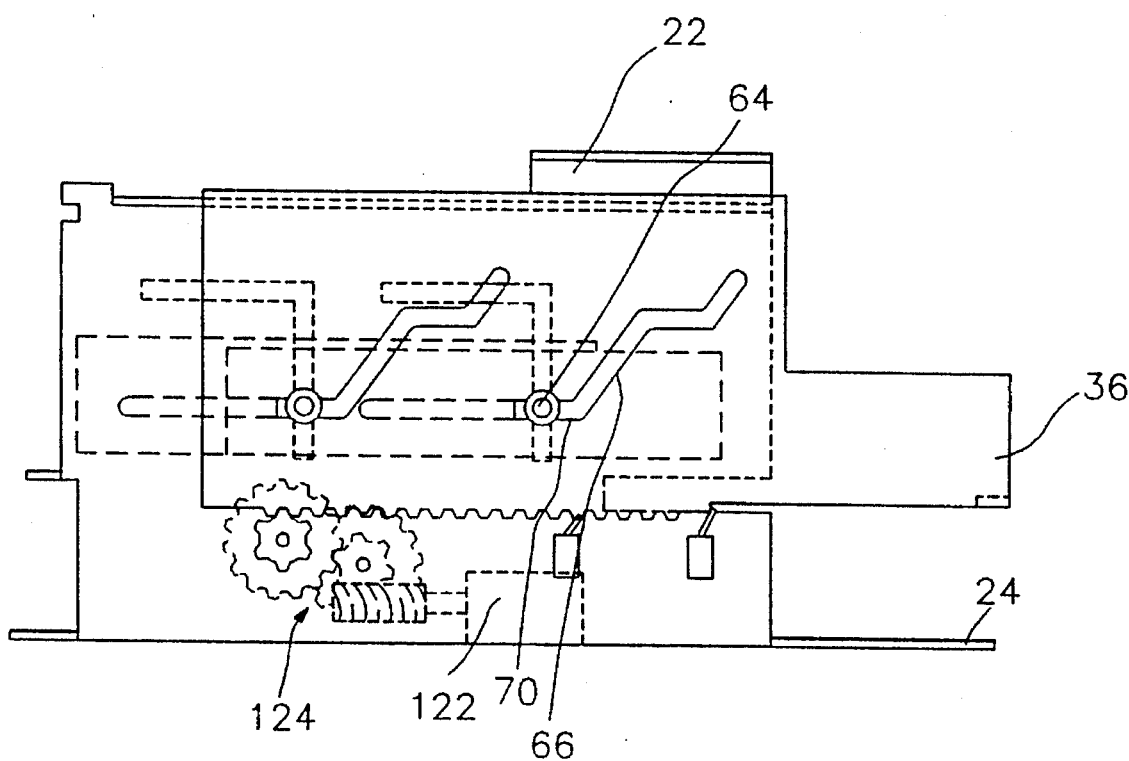
FIG. 4B is a schematic view for showing an operation of the apparatus for elevating a spindle assembly as shown in FIGS. 1 through 3 when loading a CD.

FIG. 4B is a schematic view for an operation of the apparatus for elevating a spindle assembly as shown in FIGS. 1 through 3 when loading a CD.

As shown in the figure, when a user loads a CD on compact disc tray 18 which is positioned relatively at a higher place than minidisc tray 20, the driving force of loading motor 122 is transmitted through driving gear connection part 124 to moving plate 122, which is moved backwards. The dotted-line portion of FIG. 3 indicates a state before the movement of moving plate 36. As indicated by the solid-line in FIG. 3, according to the backward movement of moving plate 36, guide rods 36 which are projected from the sides of tray holder 22 and are inserted into guide holes 66 of moving plate 36 are moved along a straight line at a predetermined distance to reach a loading position, where guide rods 36 move downwards so that guide rods 36 reach an upper stepped portion between upper inclined portion 66d and upper horizontal portion 66c. At that state, in order to maintain the same distance from a pickup device on base plate 24 to the CD as that to the MD, guide rods 36 move downwards by the height corresponding to the height difference between compact disc tray 18 and minidisc tray 20 to be positioned on a lower stepped portion between lower horizontal portion 66a and lower inclined portion 66b of guide hole 66.

At that time, in order that tray holder 22 is moved downwards to the lower stepped portion from the upper stepped portion of guide hole 66 of moving plate 36, moving plate 36 is further moved backwards at a predetermined distance corresponding to the height difference (in an arrow A direction shown in FIG. 3). Then, assembling link 54 combined with the lower portion of the rear end of moving plate 36 is pulled forwards and actuation link 60 combined with assembling link 54 and hinged on rotation axis 56 under base plate 24 is stretched from an initial folded state to be rotated centering around rotation axis 56.

In accordance with the rotational movement of actuation link 60, as shown in FIG. 3, actuation gear portion 58 formed on the front end of actuation link 60 is meshed with rack gear 42 secured to the central portion under elevating plate 30 and at the same time, as an actuation force for rotating actuation link 60 pushes elevating plate 30 by the length of elongated guide holes 128, elevating guide plate 46 formed on the inner central portion of elevating plate 30 is moved at the same distance as the length of elongated guide holes 128 (in an arrow B direction of FIG. 3).

Thus, guide pins 48 projected from bracket 26 supporting spindle assembly 16 which are inserted into cam holes 44 of elevating guide plate 46 are pushed up (in an arrow C direction), so that an overall spindle assembly 16 is moved upwards to mount the CD on compact disc tray 18 on the compact disc mounting surface of turntable 14.

At that time, when the user pushes the play switch button, the pickup device is operated to begin reproducing the CD.

When using the apparatus for elevating the spindle assembly according to the present embodiment, in the disc player which can selectively reproduce the MD and the CD by means of the single spindle assembly and pickup device, the height difference between the mounting surface of the MD and the CD can be compensated by the actuation of the elevation plate which moves in accordance with the linear movement of the moving plate. Therefore, reproducing the MD and CD can be performed more efficiently. Further, the player has a simple internal structure, so that it has become smaller and more compact in size.

Embodiment 2

Figure 5:
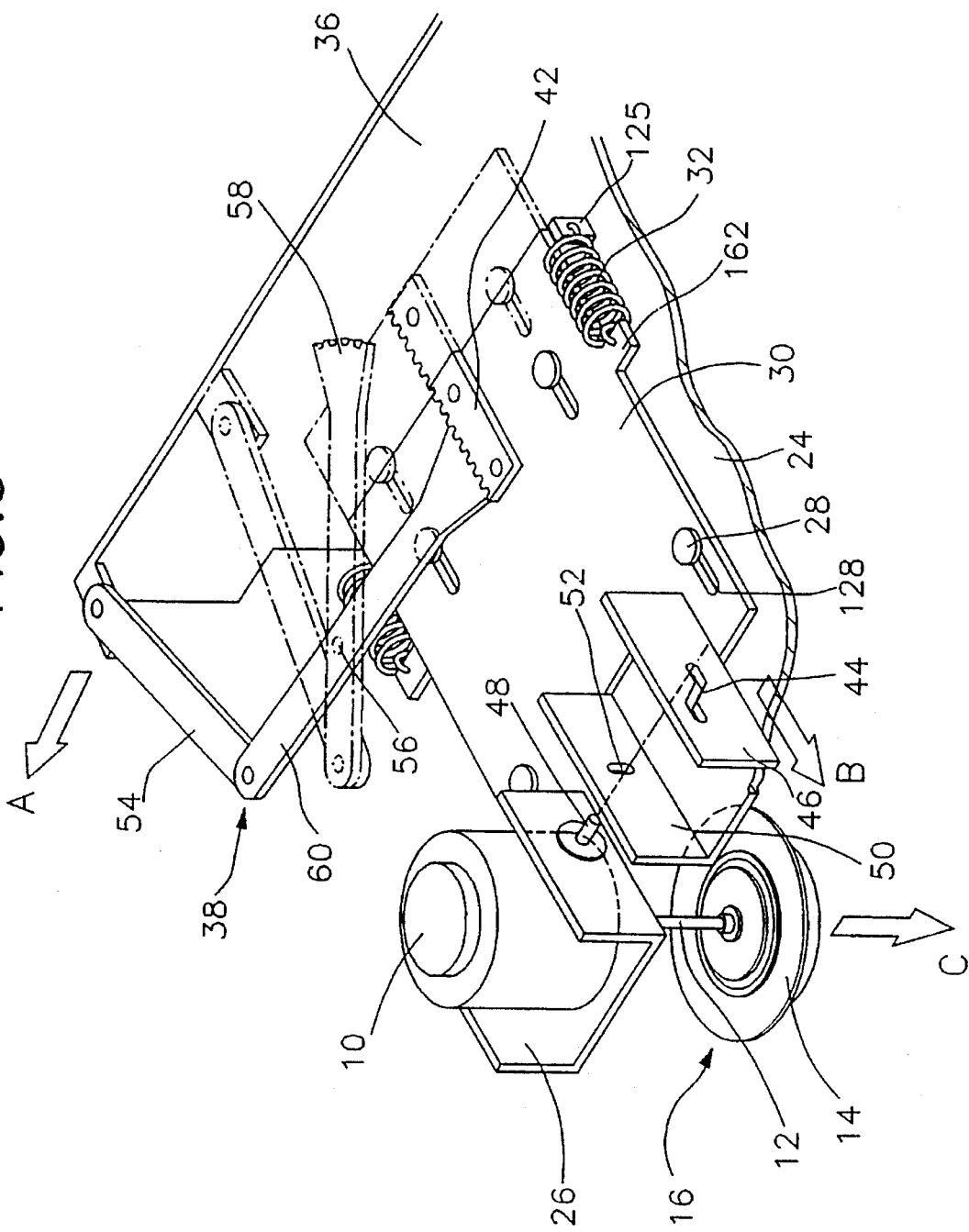
FIG. 5 is a perspective view for showing a bottom portion of an apparatus for elevating a spindle assembly according to a second embodiment of the present invention.

FIG. 5 is a perspective view for showing a bottom portion of an apparatus for elevating a spindle assembly according to a second embodiment of the present invention. The same reference numerals as those used in FIGS. 1 through 4 indicate the same members shown in FIG. 5.

When operating a minidisc player for reproduction, spindle assembly 16 is minutely vibrated at the time of driving a spindle motor 10. In the present embodiment, in order to prevent such vibrations occurring from the driving of spindle motor 10, an apparatus for elevating the spindle assembly for stabilization of movement of elevating plate 34 will be described.

The elevating apparatus of the spindle assembly according to the present embodiment is the same as that of Embodiment 1 except for a pair of vibration prevention springs 32 are disposed on the moving plate sides of elevating plate 30. Thus, the description for the other portions will be omitted.

As shown in the figure, the apparatus for elevating the spindle assembly has a pair of vibration prevention springs 32 each of which has one end secured to a spring hooked projection 162 projected from both sides of elevating plate 30 and the other end secured to a plate hooking projection 125 formed on a predetermined position of base plate 24.

An operation of the apparatus for elevating a spindle assembly according to the present embodiment is the same as in Embodiment 1 and therefore any further explanation will be omitted. Also, a dotted-line portion in FIG. 5 indicates a state before the movement of moving plate 36.

In case of using the apparatus for elevating the spindle assembly according to the present embodiment, vibration prevention spring 32 absorbs minute vibrations occurring from the driving of spindle motor 10 to stabilize the operation of moving plate 30.

Further, when spindle assembly 16 returns to an original position where a minidisc can be mounted thereon, moving plate 36 is moved in an opposite direction to an arrow A direction, so that assembling link 54 and actuation link 61 are rotated in an opposite direction to the direction when elevating the spindle assembly to move horizontally moving plate 30 opposite to an arrow B direction. At this time, a restoring force of vibration preventing spring 32 is applied thereto, so that moving plate 30 easily returns to its original position (as indicated in a dotted line).

Embodiment 3

Figure 6:
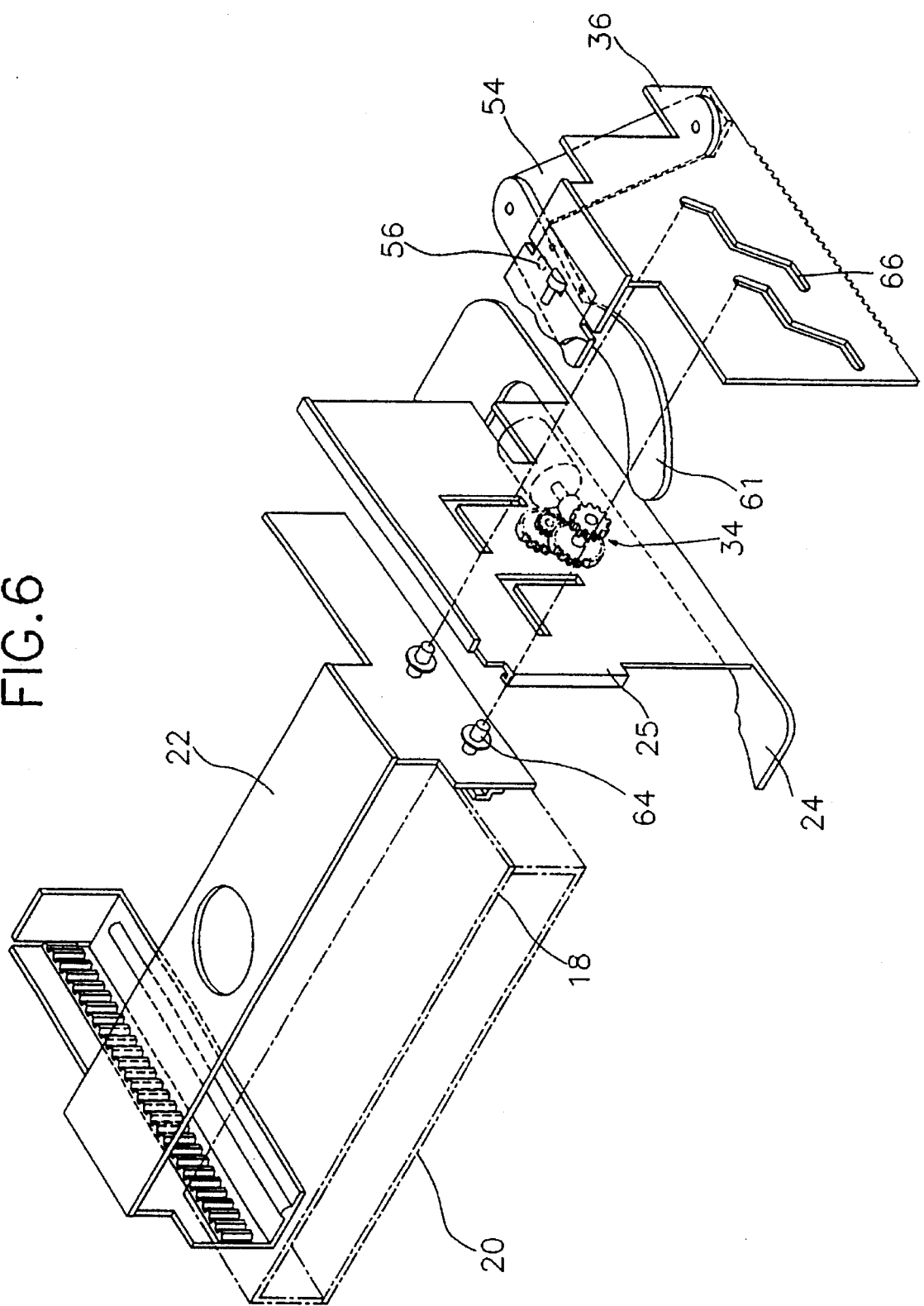
FIG. 6 is an exploded view for showing an apparatus for elevating a spindle assembly according to a third embodiment of the present invention.
Figure 7:
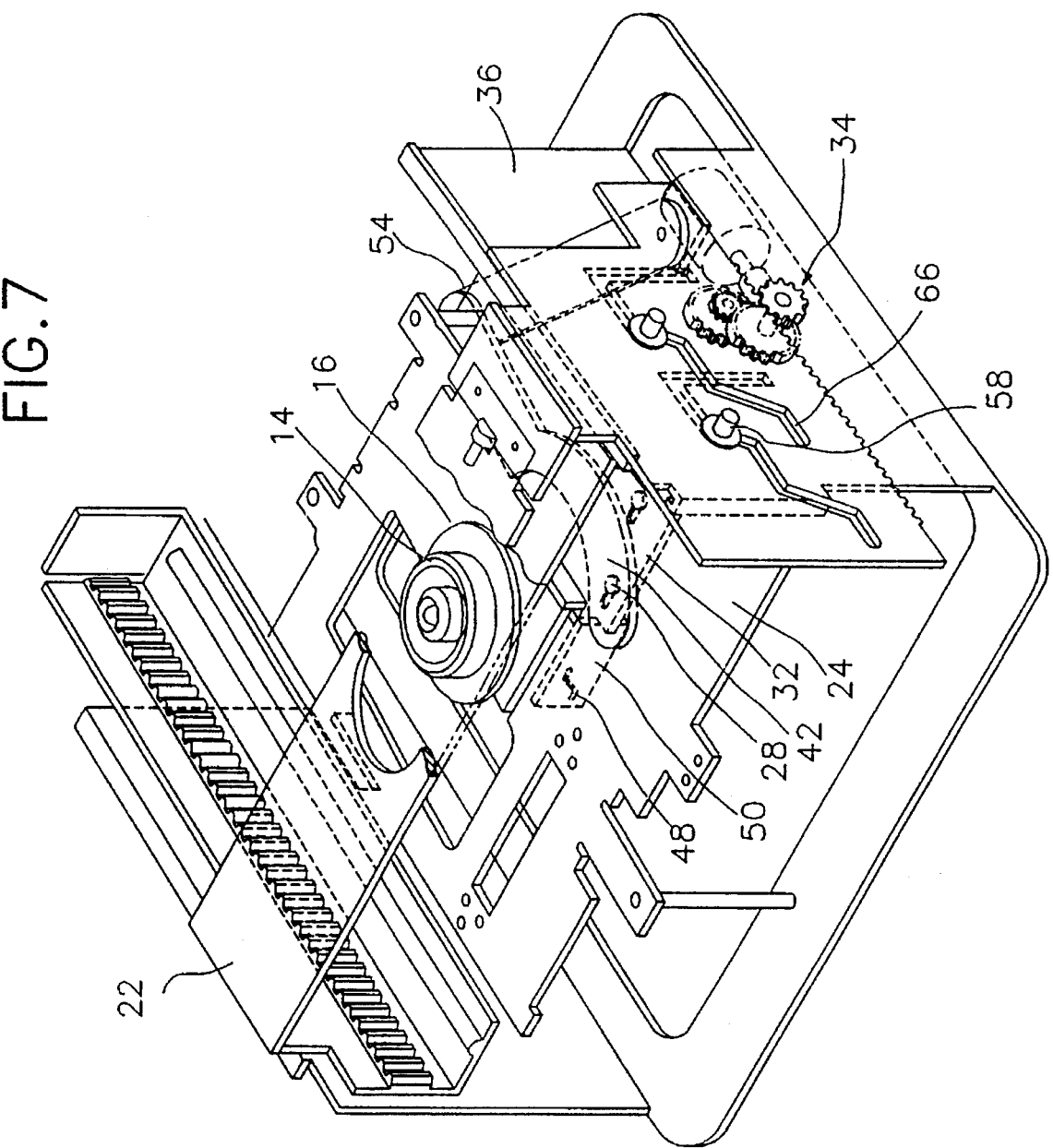
FIG. 7 is a perspective view for showing an assembled state of the apparatus for elevating a spindle assembly as shown in FIG. 6.
Figure 8:
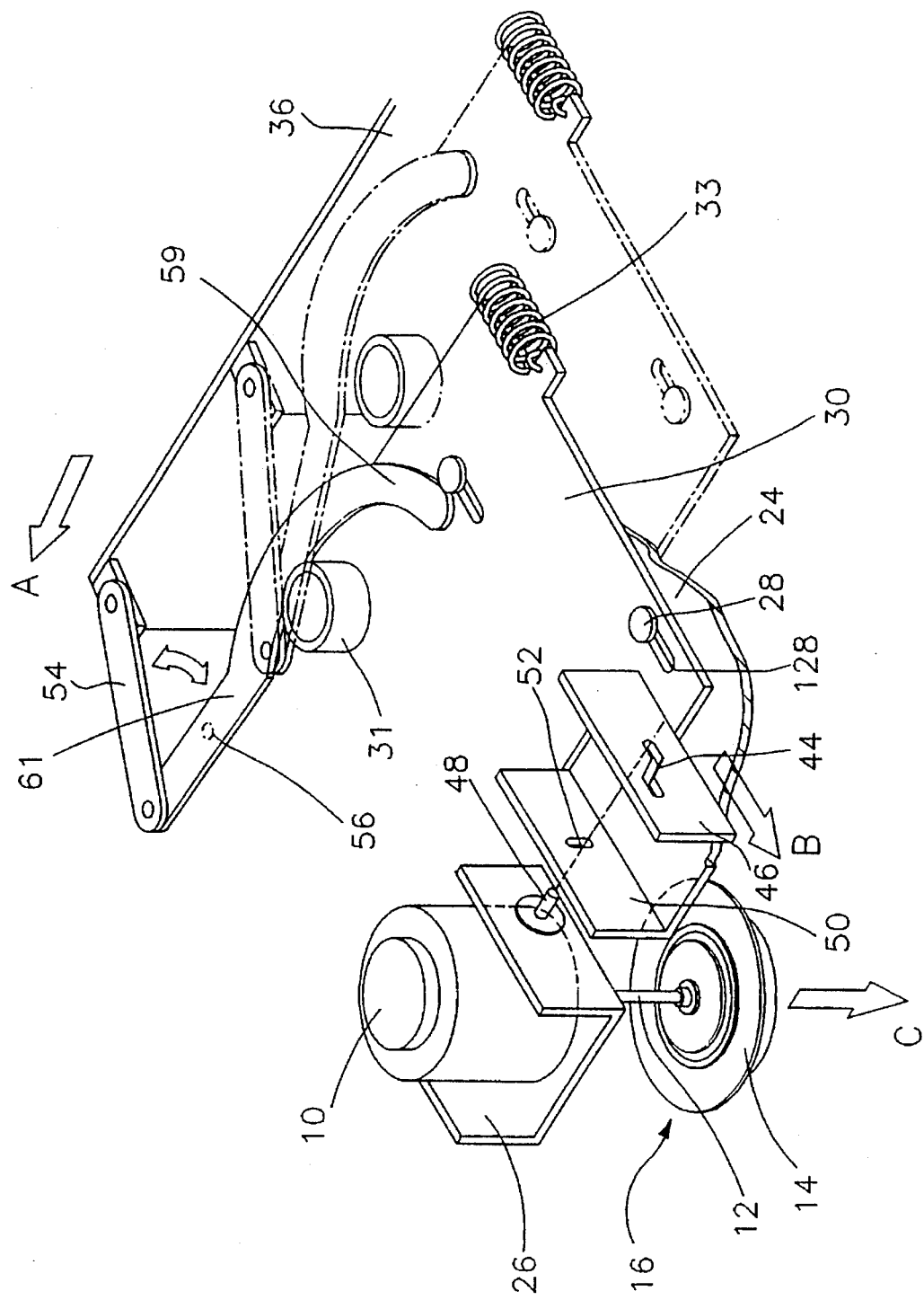
FIG. 8 is a perspective view for showing a bottom portion of the apparatus for elevating a spindle assembly as shown in FIG. 6.

FIG. 6 is an exploded view for showing an apparatus for elevating a spindle assembly according to a third embodiment of the present invention. FIG. 7 is a perspective view for showing an assembled state of the apparatus for elevating a spindle assembly as shown in FIG. 6. FIG. 8 is a perspective view for showing a bottom portion of the apparatus for elevating a spindle assembly as shown in FIG. 6. The same reference numerals as those used in FIGS. 1 through 4 indicate the same members in FIGS. 6 through 8.

The apparatus for elevating a spindle assembly according to the present embodiment is the same as that in Embodiment 2 except that the apparatus of the present embodiment has an actuation boss 31 instead of rack gear 42 of elevating plate 30 in Embodiment 2 and an actuation link 61 of actuation apparatus 38 has a different shape from the actuation link in Embodiment 2. Springs 32 of Embodiment 2 are mainly used for absorbing vibrations occurring from the rotation of spindle motor 10. However, actuation springs 33 of the present embodiment are mainly used for providing a driving force for operating elevating plate 30 in an opposite direction to an arrow B direction.

The apparatus for elevating the spindle assembly according to the present embodiment includes actuation boss 31 having a predetermined height projected from a central portion (directed to moving plate 36, i.e., the outer side) under elevating plate 30. Also, the elevating apparatus includes actuation link 61 for transmitting a driving force of moving plate 36 to actuation boss 31. One end of actuation link 61 is rotatably connected to one end of assembling link 54. A central portion of actuation link 61 is hinged under base plate 24 by means of rotation axis 56. At the other end of actuation link 61, an actuation piece portion 59 having an arc shape which partially surrounds elevating plate 30 is formed. Actuation piece portion 59 comes in contact with actuation boss 31 of elevating plate 30 when actuation link 61 is rotated, to thereby move horizontally elevating plate 30 in an arrow B direction. In the elevating apparatus of the spindle assembly according to the present embodiment provided with actuation link 61 having actuation piece portion 59 and actuation boss 31, the driving force can be transmitted more accurately than in Embodiment 1 when moving plate 36 moves in an arrow A direction.

Also, when spindle assembly 16 returns to an original position where a minidisc is mounted thereon, moving plate 36 is moved oppositely to an arrow A direction, so that assembling link 54 and actuation link 61 are rotated in the opposite direction to move horizontally elevating plate 30 in the opposite direction to an arrow B direction. At this time, an restoring force of actuation spring 33 is applied thereto, so that elevating plate 30 can easily return to its original position (as indicated in a dotted line).

Other operations of the apparatus for elevating a spindle assembly according to the present embodiment which are the same as in Embodiments 1 and 2 and therefore detailed description in this connection will be omitted.

EMBODIMENT 4

Figure 9:
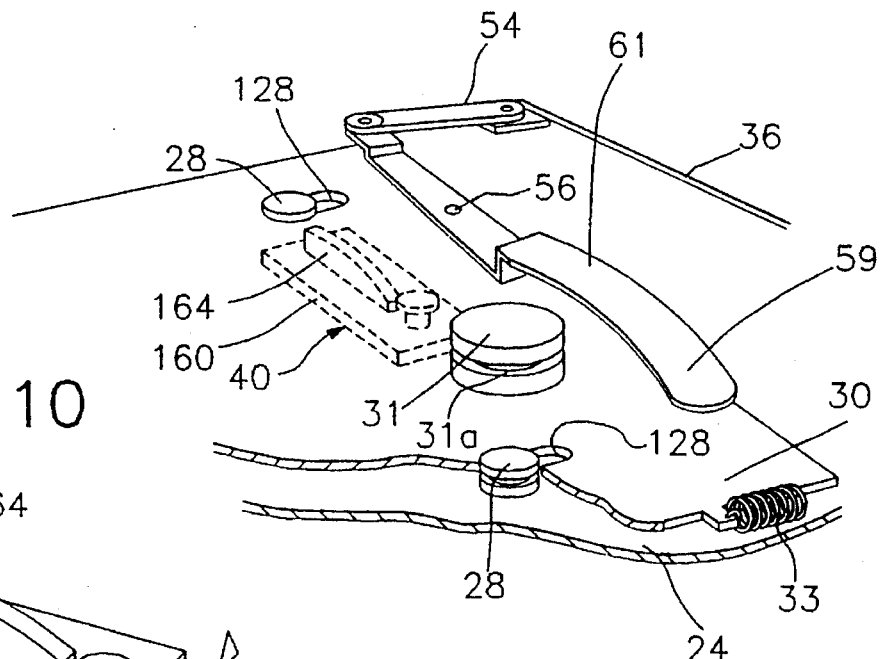
FIG. 9 is a partial perspective view for showing a bottom portion of an apparatus for elevating a spindle assembly according to a fourth embodiment of the present invention.

FIG. 9 is a partial perspective view for showing a bottom portion of the apparatus for elevating the spindle assembly according to a fourth embodiment of the present invention. In Embodiments 2 and 3, springs (reference numerals 32 in FIG. 5 and 33 in FIG. 8) are used as a vibration prevention member and an actuation member for the elevating plate, respectively. Due to an elastic force of the spring, the restoring force is applied to elevating plate 30 so that there is a possibility that elevating plate 30 is moved opposite to an arrow B direction during the reproduction of the disc. In the present embodiment, in order to prevent such a movement (which is called a "reverse movement") of moving plate 36, a reversion prevention apparatus is provided.

That is, except that the present embodiment is provided with the reversion prevention apparatus and the shapes of a central portion of the actuation link and an actuation boss are changed, the apparatus of the present embodiment is the same as that in Embodiment 3.

On a central portion of an outer side (directed to the moving plate) of the elevating plate in the apparatus for elevating a spindle assembly according to the present embodiment, actuation boss 31 is formed. A recessed groove 31a is formed on a central portion of actuation boss 31 to more ensure the connection between actuation piece portion 59 of an arc shape and actuation boss 31, so that the deviation of actuation piece portion 59 can be prevented when transmitting a driving force from actuation link 61 to actuation boss 31.

Also, the central portion of actuation link 61 hinged on base plate 24 is bent toward base plate 24, so that actuation link 61 can be more easily assembled.

Figure 10:
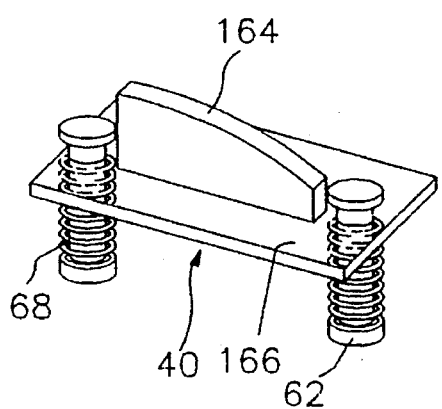
FIG. 10 is a perspective view for showing a reversion preventing member of the apparatus for elevating a spindle assembly as shown in FIG. 9.
Figure 11:
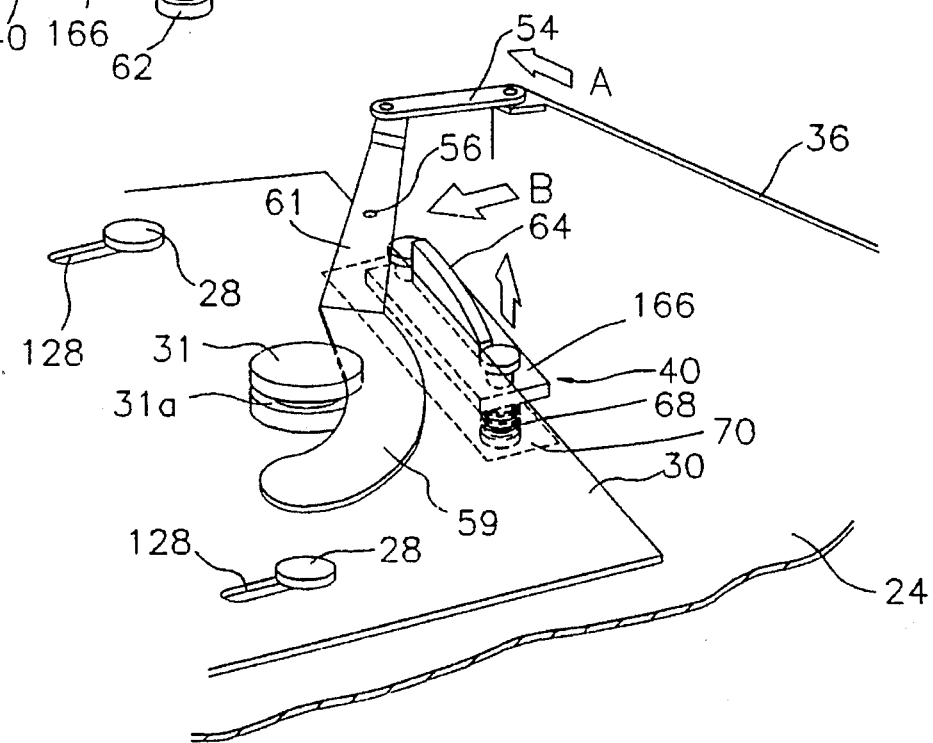
FIG. 11 is a partial perspective view for an operation of the reversion preventing member as shown in FIG. 10.

The apparatus for elevating a spindle assembly according to the present embodiment has a reversion preventing member 40 for preventing the deviation of elevating plate 24 (in the opposite direction to the arrow B direction in FIG. 8) caused by the restoring force of spring 33 when operating spindle motor 10 of the spindle assembly. FIG. 10 is a perspective view for showing the reversion preventing member of the appparatus for elevating a spindle assembly as shown in FIG. 9. FIG. 11 is a partial perspective view for showing an operation of the reversion preventing member as shown in FIG. 10.

As shown in the figures, reversion preventing member 40 which reciprocates in an arrow D direction is disposed under base plate 24 being arranged on a line which coincides with the end (the actuation link side) of elevating plate 30 in order to prevent the deviation of elevating plate 30 when spindle assembly 16 is in an elevated state. Reversion preventing member 40 has a pair of supporting pins 62 disposed on the base surface of base plate 24, a hooking piece 166 having a stopper 164 projected from a central portion of an upper surface thereof with a front end of an arc shape which is in parallel with the moving direction of the moving plate, both end portions thereof being inserted by supporting pins 62, and a pair of springs 68 which are disposed between the lower portion of supporting pin 62 and hooking piece 166 so that hooking 166 can be elastically moved.

When using the apparatus for elevating a spindle assembly according to the present embodiment, as described in Embodiments 1 to 3, when loading a compact disc, moving plate 36 moves in the arrow A direction and accordingly elevating plate 30 moves in the arrow B direction. At the state wherein elevating plate is moved, hooking piece 166 is moved up due to springs 68 under hooking piece 166, so that one end (directed to moving plate 36) of elevating plate is hooked by stopper 164 having an arc shape. When the playing the CD, vibration prevention springs (member 32 shown in FIG. 5) absorb the vibration occurring due to the rotation of turntable 14 as in Embodiment 2 or actuation spring 33 shown in FIG. 8 pulls elevating plate 30 toward moving plate 36 as in Embodiment 3. At that time, reversion preventing member 40 prevents elevating plate 30 from deviating to the moving plate direction.

Meanwhile, in the present embodiment, stopper 164 having the arc shape is provided so that hooking piece 166 can be easily moved downward when elevating plate 30 is moved opposite to the arrow B direction by the restoring force of actuation spring 33 when loading an MD for reproduction.

A stopped guiding hole 70 may be formed in base plate 24 so that stopper 164 may show up therethrough. When forming stopped guiding hole 70, stopped 164 is formed so that stopped 164 may show up through stopped guide hole 70 when elevation plate 30 moves in the arrow B direction. In such a case, elevating plate 30 can be more accurately hooked by a stopper 164. When elevating plate 30 starts to be moved opposite to the arrow B direction, stopper 164 is pushed into stopper guiding hole 70 to stabilize an operation of elevating plate 30.

Embodiment 5

Figure 12:
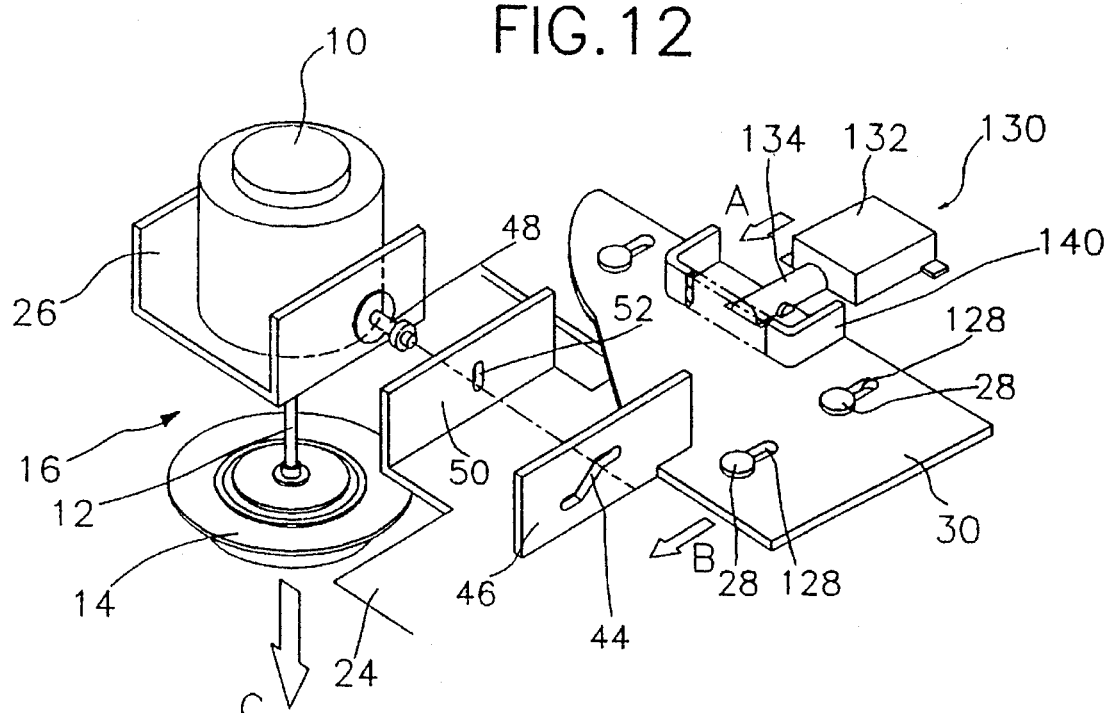
FIG. 12 is a perspective view for showing a bottom portion of an apparatus for elevating a spindle assembly according to a fifth embodiment of the present invention.

FIG. 12 is a perspective view for showing a bottom portion of the apparatus for elevating a spindle assembly according to a fifth embodiment of the present invention.

The apparatus for elevating a spindle assembly according to the present embodiment is the same as that of Embodiment 1 except for the actuation apparatus for driving elevating plate 30. That is, in Embodiment 1, it is necessary that the apparatus for elevating a spindle assembly has rack gear 42 in order to reciprocate elevating plate 30, actuation link 60 connected to rack gear 42 and assembling link 54 connected to actuation link 60 and moving plate 36. However, the apparatus for elevating a spindle assembly according to the present embodiment has a solenoid actuation apparatus 130 which is moved forward only at the time of reproducing a compact disc instead of elevating plate actuation apparatus 38 in Embodiment 1.

As shown in the figure, elevating plate 30 is provided with a receiving portion 140 where a rod can be inserted at one end side opposite to the spindle assembly. Solenoid actuation apparatus 130 has a solenoid body 132 which is disposed under base plate 24 corresponding to the receiving portion position of elevating plate 30 to electrically cause a reciprocating movement and a solenoid actuation rod 134 which is projected from solenoid body 132 and inserted into receiving portion 140. Solenoid body 132 is electrically connected to a micro processor (is also called "micom") disposed on a printed circuit substrate of the disc player. When the CD is mounted on the compact disc tray to be loaded, the micro processor senses the CD through a sensor, to flow current through solenoid body 132, so that solenoid body 132 generates an electric driving force in an arrow A direction to move solenoid actuation rod 134. Accordingly, elevating plate 30 is moved in an arrow B direction to move up the spindle assembly in an arrow C direction.

Figure 13A:
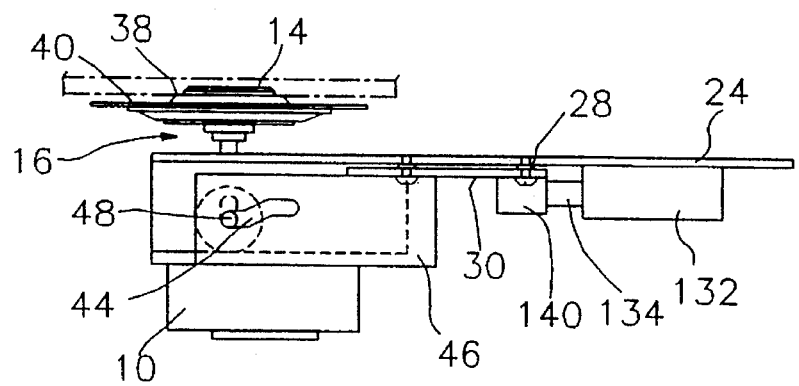
FIG. 13A is a schematic view for an operation of the apparatus for elevating a spindle assembly as shown in FIG. 12 when loading an MD.
Figure 13B:
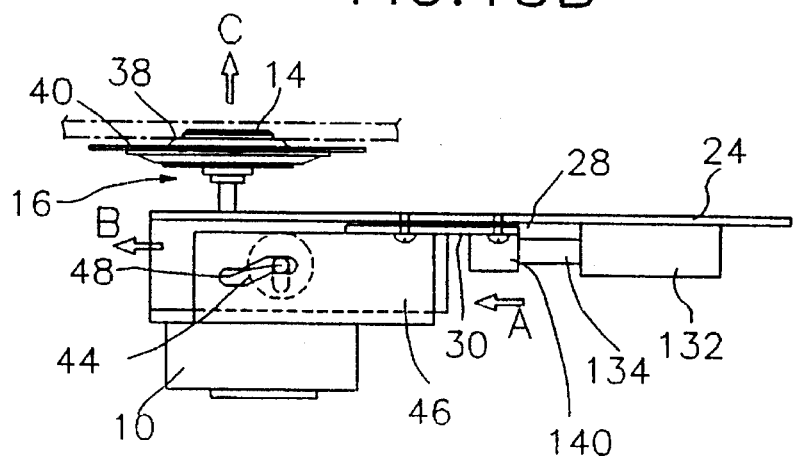
FIG. 13B is a schematic view for showing an operation of the apparatus for elevating a spindle assembly as shown in FIG. 12 when loading a CD.

FIG. 13A is a schematic view for showing the operation of the apparatus for elevating a spindle assembly as shown in FIG. 12 when loading an MD. FIG. 13B is a schematic view for showing the operation of the apparatus for elevating a spindle assembly of FIG. 12 when loading a CD.

As shown in FIG. 13A, when the minidisc cartridge is inserted into minidisc cartridge tray 20 to be loaded, solenoid actuation apparatus 130 is not operated, so that guide pin 48 of bracket 46 for supporting spindle assembly 16 maintains the state of position of a lower first horizontal portion of cam hole 44. As a result, spindle assembly 16 is maintained in a state where spindle assembly 16 is not moved up at the time of reproducing the minidisc.

In order to play a CD, a user mounts the CD on compact disc tray 18 which is placed at a predetermined height above minidisc tray 20, the micro processor senses the mounting of the CD through the sensor to operate solenoid body 132. Then, solenoid actuation rod 134 is operated to be moved in the arrow B direction and elevating plate 30 which is integrally combined with actuation rod 134 is moved in the arrow B direction at a distance corresponding to elongated guide hole 46. Then, guide pins 48 projected from bracket 26 for supporting spindle assembly 16 are moved to an upper portion of guide hole 52 formed in vertical guide plate 50 of base plate 24 to raise spindle assembly 16. At the same time, the CD mounted on compact disc tray 18 is mounted on a compact disc mounting surface formed at a lower portion of turntable 14.

According to the present embodiment, elevating plate 30 can be safely and more definitely driven by using the micro processor and the solenoid actuation apparatus as compared with the driving apparatus of the elevating plate in Embodiments 1 to 4.

Embodiment 6

The present embodiment relates to an improvement of a rack gear 42 disposed under elevating plate 30 in Embodiment 1.

That is, rack gear 42 in Embodiment 1 secured under elevating plate 30 is meshed with actuation gear part 58 of actuation link 60 which is rotated left and right centering around a rotation axis 56. At that time, since actuation link 60 is rotated while rack gear 42 is fixed, the meshing operation is not smoothly performed. This embodiment improves a construction of rack gear 42, so that the rack gear has tension which is applied in a direction of the elevating plate to perform a smooth meshing operation with the actuation gear.

Figure 14:
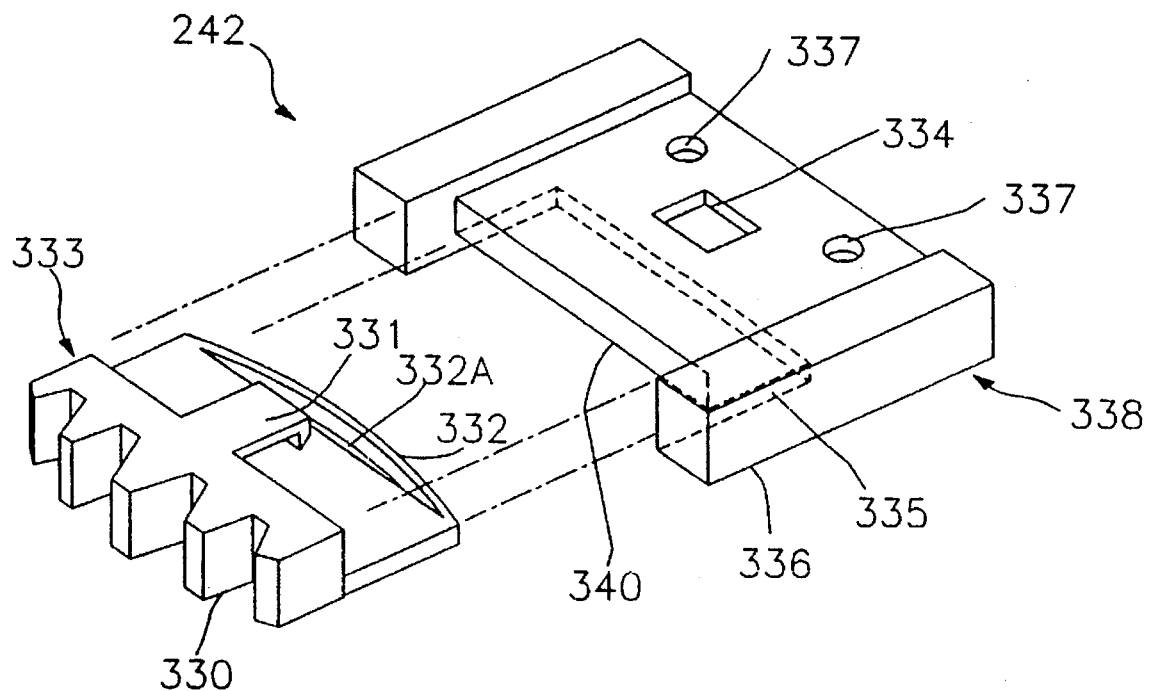
FIG. 14 is an exploded view for showing a rack gear of an apparatus for elevating a spindle assembly according to a sixth embodiment of the present invention.

FIG. 14 is an exploded view for showing a rack gear of the apparatus for elevating a spindle assembly according to the present embodiment.

As shown in the figure, rack gear 242 has a gear piece 333 and a gear bracket 338 for receiving gear piece 333. One end of gear piece 333 is provided with a smooth gear portion 330 with which actuation gear portion 58 is meshed. A hook piece 331 is projected from a central portion of an opposite end to gear portion 330 of gear piece 333 and an elastic portion 332 is integrally formed with gear piece 331 below hook piece 331. Elastic portion 332 has an arc shape to have an elastic space 332A on its end portion.

An insertion groove 340 into which elastic portion 332 is inserted is formed at a lower portion of gear bracket 338 and a pair of screw holes 337 are formed at a predetermined position of an upper surface thereof for fixing to elevating plate 30. Also, a hooking groove 334 in which hook piece 331 is hooked is formed on a central portion of the upper surface thereof. Gear guiding portions 336 are formed on both sides of insertion groove 335.

Gear piece 333 and gear bracket 338 are preferably comprised of a soft plastic to have an elasticity.

Figure 15:
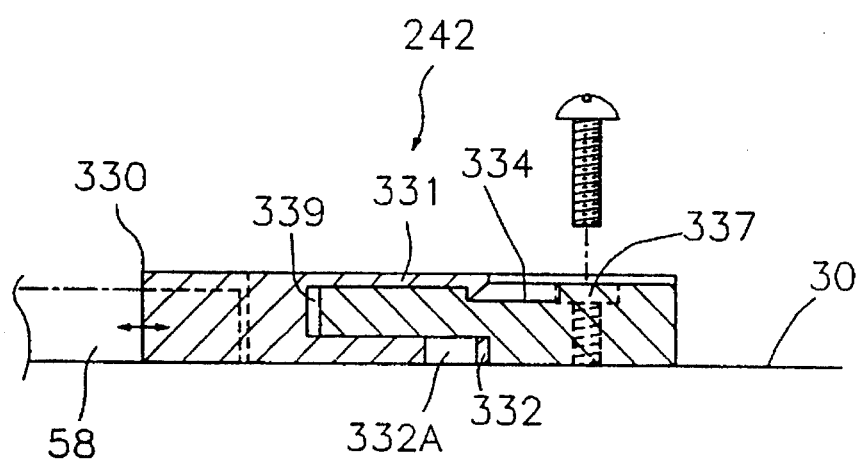
FIG. 15 is a side sectional view for showing a meshed state of the rack gear as shown in FIG. 14 with the actuation gear part of the first embodiment.

FIG. 15 is a side sectional view for showing a meshed state of the rack gear of FIG. 14 with the actuation gear portion of the first embodiment. As shown in the figure, hook piece 331 is hooked in hooking groove 334 and elastic portion 332 is inserted into insertion groove 340. A tolerance absorption gap 359 is formed between the front upper portion of gear bracket 338 and a rear portion of gear piece 333 having hook piece 331 projected therefrom, so that a tension is formed within tolerance absorption gap 339 to smoothly mesh rack gear 242 with actuation gear portion 58.

Embodiment 7

The present embodiment relates to variations of the elastic members of rack gear 242 in Embodiment 6.

Figure 16:
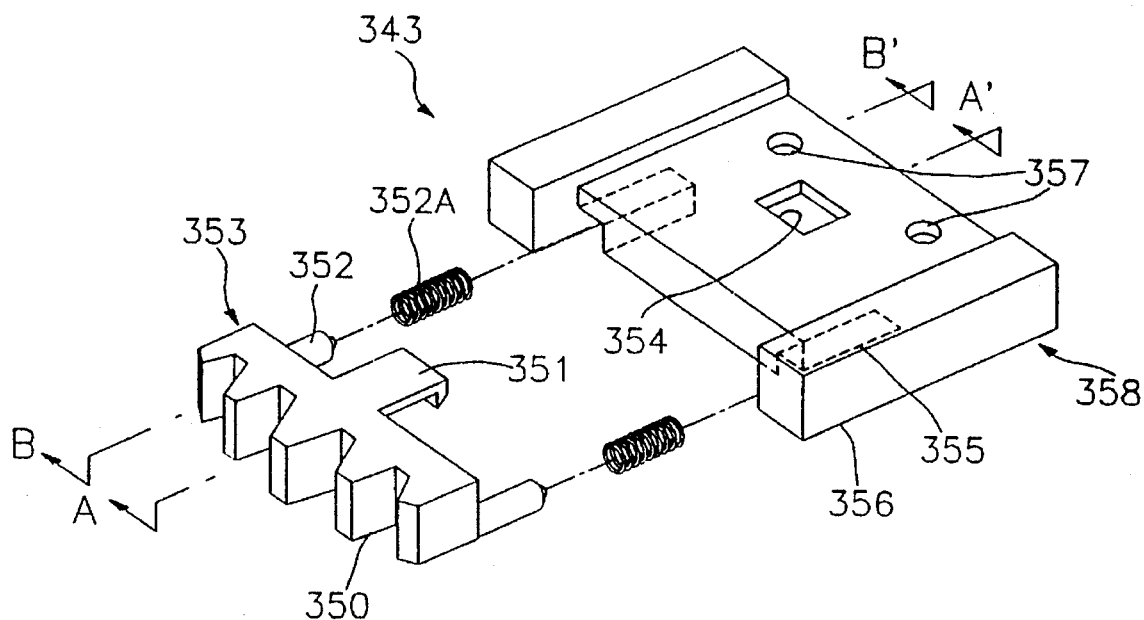
FIG. 16 is an exploded view for a rack gear of an apparatus for elevating a spindle assembly according to a seventh embodiment of the present invention.

FIG. 16 is an exploded view for showing a rack gear of the apparatus for elevating a spindle assembly according to a seventh embodiment of the present invention.

The rack gear of the present embodiment is similar to that of the sixth embodiment except for elastic members. That is, a gear portion 350 and a hook piece 351 of gear piece 353 of rack gear 343, a hooking groove 354, a gear guiding portion 356 and screw holes 357 of bracket 358 are the same as those of the rack gear in Embodiment 6, so that description therefor will be omitted.

Gear piece 353 of rack gear 343 has a pair of projections 352 each having a cylindrical shape which are projected from both side ends of a lower portion of a surface where hook piece 351 is formed. A disc-shaped projection which has a smaller diameter than that of projections 352 is formed on the front end of each of projections 352 in order to easily fix spring 352A thereon.

A pair of insertion grooves 355 is formed on portions of bracket 358 corresponding to projections 352.

Figure 17A:
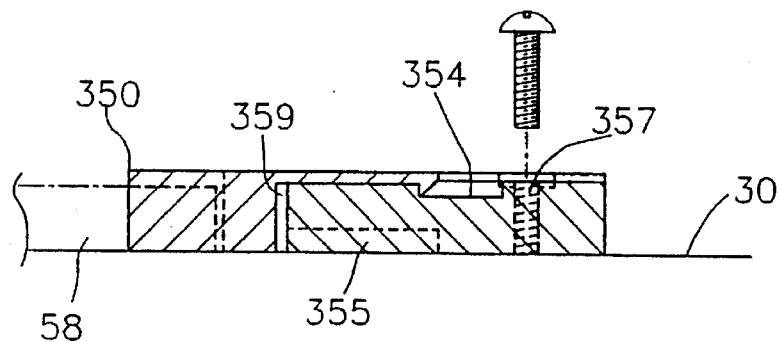
FIG. 17A is a sectional view cut along a line A–A' in FIG. 16 at a meshed state of the rack gear as shown in FIG. 16 with the actuation gear part of the first embodiment.
Figure 17B:
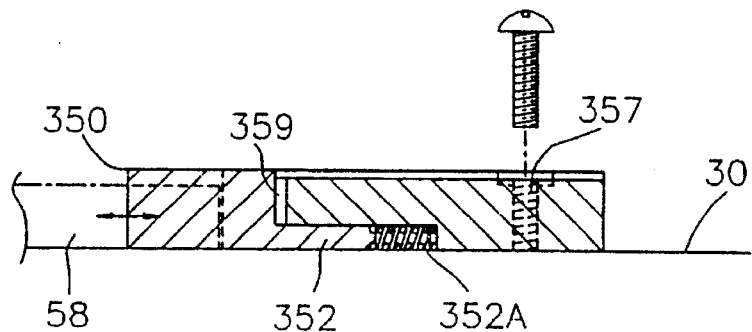
FIG. 17B is a sectional view cut along a line B–B' in FIG. 16 at a meshed state of the rack gear as shown in FIG. 16 with the actuation gear part of the first embodiment.

FIG. 17A is a sectional view cut along a line A—A' in FIG. 16 at a meshed state of the rack gear as shown in FIG. 16 with actuation gear portion 58 in Embodiment 1. FIG. 17B is a sectional view cut along a line B—B' in FIG. 16 at the meshed state of the rack gear of FIG. 16 with actuation gear portion 58 in Embodiment 1. As shown in these figures, hook piece 351 is hooked in hooking groove 354 and projections 352 are inserted into insertion grooves 355. Tolerance absorption gap 359 is formed between the front of the upper portion of gear bracket 338 and the rear of gear piece 333 having projected hook piece 331, so that tension is formed within tolerance absorption gap 359 to smoothly mesh gear portion 370 of gear piece 353 with actuation gear portion 58.

According to the sixth and seventh embodiment as described above, when the rack gear disposed on the elevating plate is meshed with an actuation gear, due to an operation of the tolerance absorption gap and the elastic portion, the rack gear has tension which is applied in the direction perpendicular to the elevating plate and to be moved at a predetermined width to achieve a smooth meshing operation therewith.

In case of using the apparatus for elevating a spindle assembly of the disc player according to the present invention which can selectively reproduce an MD and a CD by means of the single spindle assembly and pickup apparatus, the height difference between the mounting surface of the MD and the CD can be compensated by the linear movement of the moving plate or by the solenoid actuation apparatus, so that reproducing the MD and CD can be performed more efficiently. Further, the player has a simple internal structure, so that it has become smaller and more compact in size.

It is understood that various other modifications will be apparent to and can be readily made by those skilled in the art without departing from the scope and spirit of this invention. Accordingly, it is not intended that the scope of the claims appended thereto be limited to the description as set forth herein, but rather that the claims be constructed as encompassing all the features of the patentable novelty that reside in the present invention, including all the features that would be treated as equivalents thereof by those skilled in the art to which this pertains.

What is claimed is:

1. A disc player comprising:
    a base plate;
    a spindle assembly secured to said base plate and having a turntable for rotating a disc, said spindle assembly being reciprocated vertically in a first direction;
    an elevating means secured under said base plate for reciprocating said spindle assembly, said elevating means being horizontally reciprocated within a predetermined distance in a second direction perpendicular to the first direction; and
    an actuation means for actuating a reciprocating movement of said elevating means and said actuating means being installed below said base plate,
    wherein said elevating means has an elevating plate to reciprocate in a horizontal direction under said base plate, a rack gear formed on a central portion of an outer side of the elevating plate adjacent to a moving plate in a reciprocating direction of the elevating plate to be connected to said actuation means, and a pair of elevating guide plates each having a cam hole for defining a vertical reciprocating movement of said spindle assembly and formed on a central portion of an inner side of the elevating plate adjacent to said spindle assembly, said cam hole having a predetermined height and having a first lower horizontal portion and a second higher horizontal portion which have the same difference as said height and an inclined portion being formed between the first and second horizontal portions,
    wherein the rack gear has:
        a gear piece having a gear portion connected to said actuation means, a hook piece disposed on an opposite side to a gear formation portion and an elastic portion for absorbing impacts; and
        a bracket having a hooking groove where the hook piece is hooked, an insertion groove for receiving the elastic portion, gear guide portions for guiding the gear piece and screw holes for securing to the elevating plate.

2. The disc player as claimed in claim 1, wherein the elastic portion is integrally combined with the gear piece and a section of a bracket side has an elastic space of an arc shape.

3. The disc player as claimed in claim 1, wherein the elastic portion has projections each having a cylindrical shape and a spring secured to each of front ends of the projections.

4. The disc player as claimed in claim 1, wherein said actuation means has an assembling link rotatably connected to a lower portion of a rear end of a moving plate to be rotated backwards and forwards conforming to a reciprocating movement along a straight line of the moving plate and an actuation link having a first end rotatably connected to an end of the assembling link and a second end having an actuation gear portion shaped in an arc which is meshed with said elevating means, the actuation link being hinged under said base plate at a center portion thereof through a rotation shaft.

5. The disc player as claimed in claim 1, further comprising a vibration prevention means for absorbing minute vibrations when a spindle motor is operated.

6. The disc player as claimed in claim 5, wherein said vibration preventing means has a pair of spring engaging projections projected from both sides of said elevating means, a pair of plate hooking projections projected from bottom portions of said base plate and a pair of springs secured to said spring engaging projections and said plate hooking projections.

7. The disc player as claimed in claim 6, further comprising a deviation preventing means for preventing said elevating means from being moved away as caused by the spring of said vibration preventing means, said deviation preventing means having a pair of supporting pins disposed on a base surface of said base plate, a hooking piece having a stopper projected from a central portion of an upper surface thereof with a front end of an arc shape which is in parallel with the moving direction of said moving plate, both end portions thereof being inserted by supporting pins, and a pair of springs which are disposed between the lower portion of supporting pin and hooking piece so that hooking piece can be elastically moved.

8. The disc player as claimed in claim 1, wherein a receiving portion is formed on one end of said elevating means corresponding to an opposite side of said spindle assembly and said actuation means has an actuation rod inserted into the receiving portion to be fixed thereto and a solenoid body operating the actuation rod in a reciprocating movement by an electric force.

9. The disc player as claimed in claim 1, wherein said actuation means receives a reciprocating force from a moving plate which is reciprocated horizontally in a third direction perpendicular to the second direction to transmit a driving force to a tray on which the disc is mounted for loading and unloading the disc, in order to actuate said elevating means.

10. The disc player as claimed in claim 1, said disc player further comprising a tray holder supporting a disc cartridge tray on which a first disc encased in a cartridge is mounted and a disc tray on which a second naked disc larger than the first disc is mounted, the first disc and the second disc being selectively mounted, said actuating means driving said elevating means so that said spindle assembly reciprocates vertically within a distance corresponding to difference of heights between the disc cartridge tray and the disc tray.

11. The disc player as claimed in claim 1, wherein said spindle assembly has a spindle shaft connected to the turntable and a spindle motor for driving the spindle shaft, the spindle assembly being supported by a bracket having a pair of guide pins projected from its sides toward the outside.

12. The disc player as claimed in claim 1, wherein said actuation means has an assembling link rotatably connected to a lower portion of a rear end of a moving plate to be rotated backwards and forwards conforming to a reciprocating movement along a straight line of the moving plate, an actuation link having a first end rotatably connected to an end of the assembling link and a second end having an actuation piece portion shaped in an arc which is meshed with said elevating means, and a spring connected between said base plate and said elevating means.

13. The disc player as claimed in claim 12, wherein the central portion of the actuation link where the actuation link is hinged on said base plate is bent towards said base plate so that the actuation link is easily hinged on said base plate.

14. A disc player comprising:

a base plate;

a spindle assembly secured to said base plate and having a turntable for rotating a disc, said spindle assembly being reciprocated vertically in a first direction;

an elevating means secured under said base plate for reciprocating said spindle assembly, said elevating means being horizontally reciprocated within a predetermined distance in a second direction perpendicular to the first direction; and an actuation means for actuating a reciprocating movement of said elevating means and said actuating means being installed below said base plate, wherein said elevating means has an elevating plate formed under said base plate to reciprocate in a horizontal direction, an operation boss projected from a central portion of an outer side of the elevating plate adjacent to a moving plate to be connected to said actuation means and a pair of elevating guide plates each having a cam hole at a central portion thereof for defining a reciprocating movement in a vertical direction, the elevating guide plate being at a central portion of an inner side of the elevating guide plate adjacent to said spindle assembly, said cam hole having a predetermined height and having a first lower horizontal portion and a second higher horizontal portion which have the same difference as said height and an inclined portion being formed between the first and second horizontal portions.

15. The disc player as claimed in claim 14, wherein a recessed groove for being easily connected to said actuation means is formed on an outer periphery of the actuation boss.

16. The disc player as claimed in claim 14, wherein said actuation means has an assembling link rotatably connected to a lower portion of a rear end of a moving plate to be rotated backwards and forwards conforming to a reciprocating movement along a straight line of the moving plate, an actuation link having a first end rotatably connected to an end of the assembling link and a second end having an actuation piece portion shaped in an arc which is meshed with said elevating means, and a spring connected between said base plate and said elevating means.

17. The disc player as claimed in claim 16, wherein the central portion of the actuation link where the actuation link is hinged on said base plate is bent towards said base plate so that the actuation link is easily hinged on said base plate.

18. The disc player as claimed in claim 16, further comprising a reversion preventing means for preventing deviation of said elevating means caused by the spring.

19. The disc player as claimed in claim 18, wherein said reversion preventing means is formed under said base plate in alignment with one end of said elevating means directed to the actuation link for preventing deviation of said elevating means when said spindle assembly is elevated by said elevating means.

20. The disc player as claimed in claim 18, wherein said reversion preventing means has a pair of supporting pins disposed on a bottom surface of said base plate, a hooking piece having a stopper projected from a central portion of an upper surface thereof with a front end of an arc shape which is horizontally placed in a third direction perpendicular to the second direction of the moving plate, and a pair of springs disposed between lower portions of the supporting pins and the hooking piece so that the hooking piece can be elastically moved therebetween.

\* \* \* \* \*